(No Model.)

J. GIBSON & J. WATSON.
CAR FENDER.

No. 569,822.  Patented Oct. 20, 1896.

Witnesses:
David C. Walter
L. E. Brown

Inventors:
John Gibson,
John Watson,
By Henon Hall, Atty.

THE NORRIS PETERS CO., PHOTO-LITHO., WASHINGTON, D. C.

UNITED STATES PATENT OFFICE.

JOHN GIBSON AND JOHN WATSON, OF TOLEDO, OHIO.

CAR-FENDER.

SPECIFICATION forming part of Letters Patent No. 569,822, dated October 20, 1896.

Application filed March 25, 1896. Serial No. 584,726. (No model.)

*To all whom it may concern:*

Be it known that we, JOHN GIBSON and JOHN WATSON, citizens of the United States, and residents of Toledo, Lucas county, Ohio, have invented certain new and useful Improvements in Fenders or Safety-Guards for Street-Cars, of which the following is a specification.

Our invention relates to and its object is to provide an attachment of improved construction for the forward ends of street-cars, the attachment being designed to prevent persons who may be run down by the car from falling under the wheels or being otherwise seriously injured.

In providing safety-fenders for street-cars they should project ahead of the car sufficiently to prevent any one who may be caught from being struck by the forward end of the car. This arrangement, however, practically lengthens the car to such an extent that it takes up too much room in car-houses. Moreover, it causes the front end of the fender to extend laterally away from the track when the car is passing around short curves, tending to cause collision with other cars passing on adjoining tracks in the opposite direction. It is also necessary in the use of guards or fenders of the class in question to provide means for the vertical adjustment of the fender, so that it may be accommodated to deep snows and other obstructions.

Our invention is designed to accomplish the objects and overcome the objections here pointed out.

The further object of our invention is to provide the outer edge of the forwardly-projecting part of our fender with an elastic cushion or guard, adapted to prevent injury to the lower extremities of possible passengers upon the fender.

We attain these objects by means of the device and arrangement of parts hereinafter described, and shown and illustrated in the accompanying drawings, made part hereof, in which—

Figure 1:
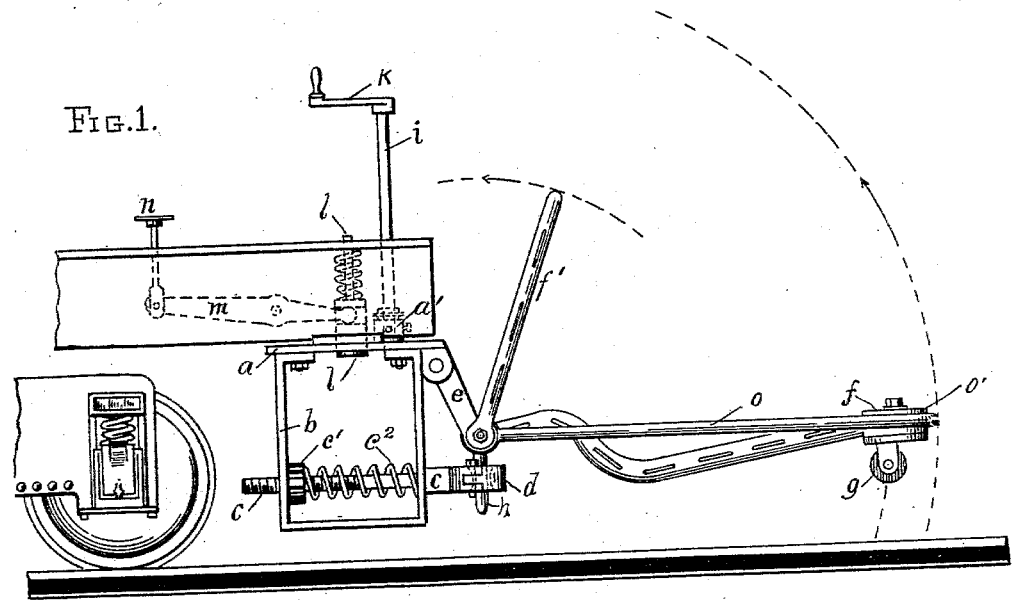
Figure 2:
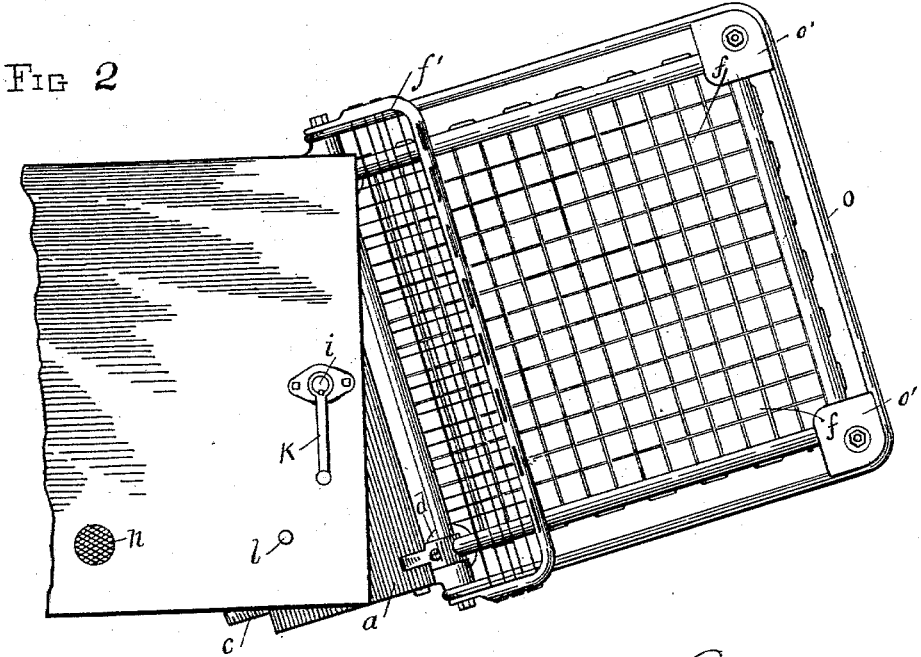

Figure 1 is a side elevation of our device, and Fig. 2 a plan view of the same.

Like letters of reference indicate like parts in both views.

In the drawings, the body of a car is shown mounted upon a truck in the usual manner. Under the forward end of the forward platform is a plate $a$, which extends from side to side of the car nearly its full width. At each end of this plate is secured, on its under side, a downwardly-projecting housing $b$, which is bored or slotted to receive a horizontal rod $c$, which is adjustable longitudinally in the housing. This horizontal adjustment is obtained by means of a nut $c'$ within the housing, which takes the screw-threaded rear end of rod $c$. A stout spiral spring $c^2$, surrounding the rod and pressing against the housing at its forward end and the nut at its rear end, holds the nut and rod in their adjusted position and while holding the fender rigidly against downward movement provides the necessary upward resiliency for the fender.

It should be understood that there are two of the rods $c$ with their adjusting attachments, there being one at each side of the car, although but one is shown in the drawings. The rod $c$ at its forward end terminates in a loop or ring $d$, which may be opened or closed at will.

Pivoted to the front edge of the plate $a$ are forwardly and downwardly projecting arms $e$, upon which is pivotally supported the fender $f$, carried normally in nearly horizontal position and composed, preferably, of a frame of tubing provided with the usual netting. There is also pivotally secured to the arms $e$ a supplemental fender $f'$, likewise composed of a frame of tubing and netting secured thereto and carried normally in nearly a vertical position. The two frames $f$ and $f'$ are adapted to fold upwardly and backwardly, as indicated by the dotted lines in Fig. 1, against the forward end of the car when not in use. The horizontal portion of the fender is provided near its forward end with rollers or casters $g$, adapted to roll upon the track when the fender is lowered to its limit. A downwardly-extending arm $h$, rigid with the rear part of the fender $f$, projects through the ring $d$ on the forward end of the bar $c$. The plate $a$, from which the fender and its adjusting mechanism are suspended, is adapted to swing horizontally. The pivotal support $a'$ of the plate $a$ projects upwardly through the floor of the front platform. To this pivot is secured a staff $e$, which at top is provided with a handle $k$ within convenient reach of the operator.

$l$ is a spring-controlled stop adapted to engage the plate $a$, and, through lever $m$ and pedal $n$, the stop may be raised or lowered by the foot of the operator, causing the stop to engage or disengage the plate $a$ at will. This stop consists of a stout pin $l$, moving vertically in suitable guides and held normally depressed by a coiled spring pressing upwardly against the floor of the platform and downwardly against a sleeve rigid on the pin. In the plate $a$ is a series of holes (not shown in the drawings) adapted to receive the lower end of the pin as the plate $a$ with its attachments is swung to and fro, thus holding the fender at any desired angle to the car. When the pedal is depressed and the plate $a$ released from stop $l$, the operator by means of handle $k$ may swing plate $a$ with its attachments either to the right or left, thus permitting the fender to be thrown out of harm's way when rounding short curves and when, upon adjoining tracks, cars may be moving in the opposite direction.

By opening the ring $d$ the two-part fender may be folded upwardly and backwardly against the end of the car, so that the car shall not take up too much room in the car-house. When by means of nuts $c'$ the rod $c$ is projected or retracted longitudinally, arm $h$, which engages the loop upon the forward end of the rod $c$, will raise or lower the horizontal part of the fender so that the fender may be accommodated to heavy falls of snow or other obstructions.

Around the outside of the horizontal part of the fender is stretched a soft flexible guard $o$, formed, preferably, of india-rubber hose. To receive and retain the guard $o$, the forward corners of the horizontal part of the fender are provided with blocks $o'$, having rounded corners, as shown, and having grooves to receive the rubber guard.

Having described our invention, what we claim, and desire to secure by Letters Patent, is—

1. A street-car fender comprising a plate extending under and across the forward end of the front platform, a two-part fender pivotally supported from said plate and adapted to fold upwardly against the forward end of the car, a housing projecting downwardly from each end of said plate, a spring-controlled, adjustable horizontal rod in each of said housings, means for connecting said rod with said fender whereby, through the adjustment of said rod, the fender may be supported at any desired height, means for swinging said plate with its attachments horizontally, and means for securing said plate at any position to which it may be swung, substantially as and for the purpose specified.

2. In a street-car fender, a tubular frame provided with a suitable netting, corner-blocks secured to the forward angles of said frame having rounded corners and grooved rims, in combination with an elastic guard, (as an india-rubber hose,) extending from the rear of said fender around its outer edge and in the grooves of said corner-blocks, substantially as and for the purpose specified.

JOHN GIBSON.
JOHN WATSON.

In presence of—
P. A. MACGAHAN,
L. E. BROWN.